(12) United States Patent
Chevillat et al.

(10) Patent No.: US 9,654,816 B2
(45) Date of Patent: May 16, 2017

(54) SYNCHRONIZING A VIDEO FEED WITH INTERNET CONTENT DISPLAYED ON A SECOND DEVICE

(75) Inventors: Jérôme Chevillat, Neuchâtel (CH); Torsten Butz, Renens (CH)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 13/289,227

(22) Filed: Nov. 4, 2011

(65) Prior Publication Data
US 2013/0117406 A1 May 9, 2013

(51) Int. Cl.
*G06F 15/16* (2006.01)
*H04N 21/41* (2011.01)
*H04N 21/436* (2011.01)
*H04N 21/858* (2011.01)

(52) U.S. Cl.
CPC ..... *H04N 21/4104* (2013.01); *H04N 21/4113* (2013.01); *H04N 21/4126* (2013.01); *H04N 21/436* (2013.01); *H04N 21/8586* (2013.01)

(58) Field of Classification Search
CPC ..... H04L 63/0428; H04L 63/08; H04L 63/10; H04L 29/06027; H04L 65/1069; H04L 65/403; H04L 67/02
See application file for complete search history.

(56) References Cited

U.S. PATENT DOCUMENTS

| | | | | |
|---|---|---|---|---|
| 6,061,719 | A * | 5/2000 | Bendinelli et al. | 725/110 |
| 7,058,721 | B1 * | 6/2006 | Ellison et al. | 709/231 |
| 7,158,676 | B1 * | 1/2007 | Rainsford | 382/190 |
| 2002/0038383 | A1 * | 3/2002 | Ullman et al. | 709/245 |
| 2003/0061451 | A1 * | 3/2003 | Beyda | G06F 17/30902 711/137 |
| 2006/0195545 | A1 * | 8/2006 | Kikkawa et al. | 709/217 |
| 2007/0180488 | A1 * | 8/2007 | Walter et al. | 725/135 |
| 2009/0031390 | A1 * | 1/2009 | Rajakarunanayake et al. | 725/142 |
| 2009/0144788 | A1 * | 6/2009 | Limbasia | 725/110 |
| 2010/0070643 | A1 * | 3/2010 | Puranik et al. | 709/231 |

OTHER PUBLICATIONS

R. Fielding, J. Gettys, J. Mogul, H. Frystyk, T. Berners-Lee RFC 2068 Jan. 1997 Pertinent pp. 1-152.*

* cited by examiner

*Primary Examiner* — Tauqir Hussain
*Assistant Examiner* — Thao Duong
(74) *Attorney, Agent, or Firm* — Parker Ibrahim & Berg LLC; James M. Behmke; Stephen D. Lebarron

(57) ABSTRACT

Synchronizing a video feed with internet content displayed on a second device is described. In some implementations, a first device (e.g., a set-top box) can receive a video stream, extract URLs from the video stream and transmit the URLs to a web server for storage. The web server can respond to requests from a web browser on a second device (e.g., a laptop, tablet computer, etc.) to get the URL associated with the video stream. The second device can use the URL to display internet content associated with the video stream.

21 Claims, 6 Drawing Sheets

| Content 210 | Advert. Content 212 | Content 214 | Advert. Content 216 | Content 218 |
|---|---|---|---|---|
| 220 | Advert. URL 222 | 224 | Advert. URL 226 | 228 |

SYNCHRONIZING A VIDEO FEED WITH INTERNET CONTENT DISPLAYED ON A SECOND DEVICE

TECHNICAL FIELD

The present disclosure generally relates to interactive media technologies.

BACKGROUND

Interactive television is becoming more popular as broadcast television and internet converge. The widespread availability of the internet in the home as well as the increasing number of mobile devices that are capable of displaying internet content can give television viewers an opportunity to search the internet for content related to television content viewed on their televisions. Viewers can currently perform manual internet searches to find content related to content viewed on their televisions. However, performing manual internet searches to find content related to television content is often tedious and inconvenient.

BRIEF DESCRIPTION OF THE DRAWINGS

In the drawings:

FIG. 2 illustrates an example video feed with synchronized URLs.

DETAILED DESCRIPTION

Synchronizing a video feed with internet content displayed on a second device is described. In the following description, for the purposes of explanation, numerous specific details are set forth in order to provide a thorough understanding of the implementations described herein.

Implementations are described herein according to the following outline:

1.0 General Overview
2.0 Description of Particular Implementations
3.0 Synchronizing a Video Feed with Internet Content on a Second Device
  3.1 Extracting URLs from Video Feeds
  3.2 Providing URLs to Display Devices
  3.3 Alternate Implementations
4.0 Implementation Mechanisms—Hardware Examples
5.0 Extensions and Alternatives
1.0 General Overview Synchronizing a video feed with internet content displayed on a second device is described. In some implementation, a first device (e.g., a set-top box) can receive a video stream, including metadata associated with the video stream. The metadata can include uniform resource locator (URL) information and timestamps corresponding to the URLs. The URLs can correspond to portions of the video stream (e.g., the URLs are synchronized with the portions of the video stream). Once the video stream, and metadata, is received, the device can extract the URL information from the metadata along with the corresponding timestamp and transmit the metadata and timestamp to a web server.

In some implementations, a web server running on a second device (e.g., a router) can receive a URL and a timestamp corresponding to the URL. The web server can store the URL and timestamp in a database of URLs. The web server can receive a request from a third device (e.g., a laptop, tablet computer, etc.) for the most recent URL in the database. The web server can determine the most recent URL based on the timestamps associated with the URLs in the database and transmit the URL to the third device.

Other implementations encompass a computer apparatus and a computer-readable medium configured to carry out the foregoing processes.

Particular implementations provide at least the following advantages: content producers, advertisers and/or distributors are able to enrich their content offerings with interactive content; internet enabled consumer devices can be leveraged to present advertising content relevant to television content being viewed by users of the devices.

2.0 Description of Particular Implementations

Figure 1:
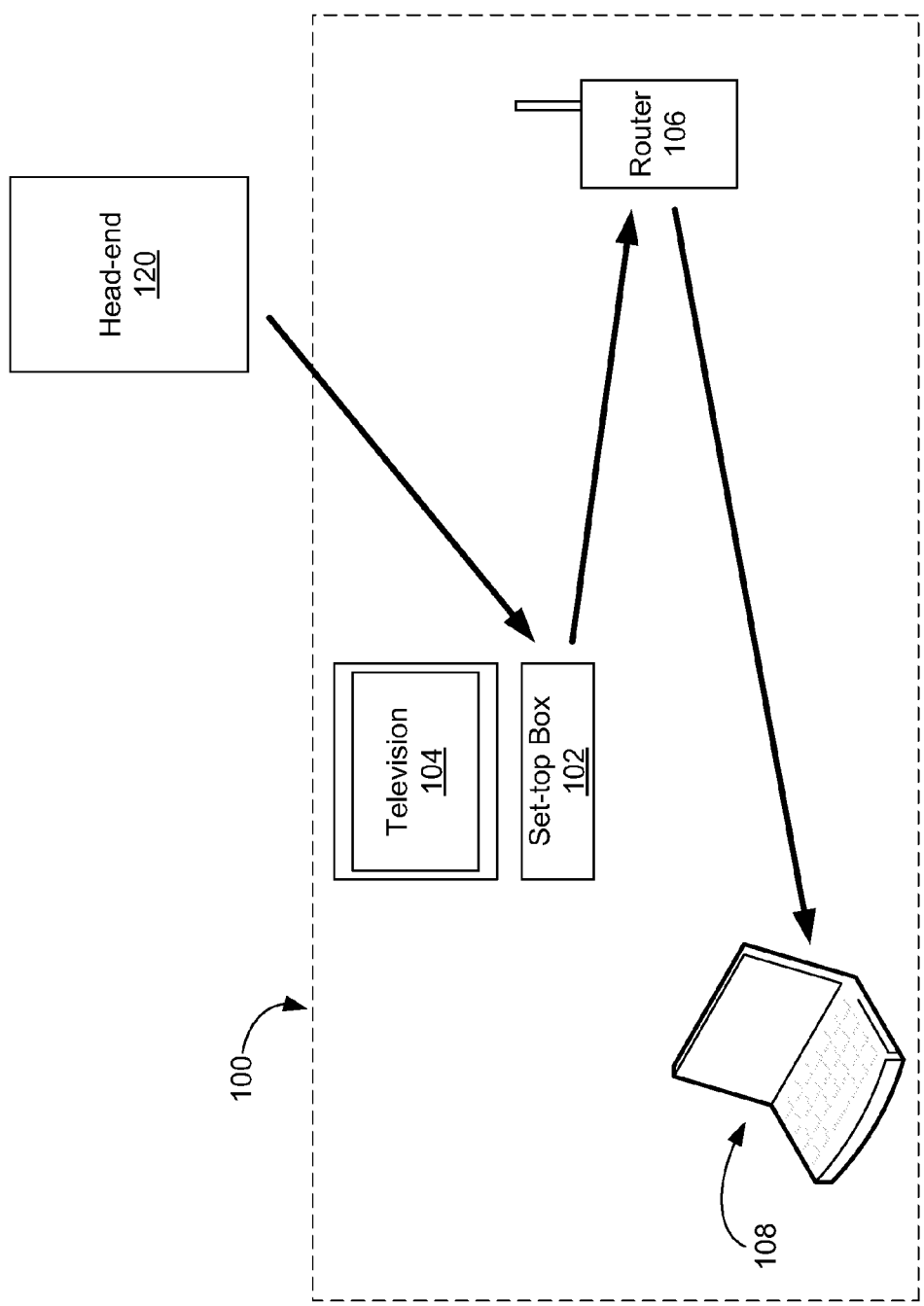
FIG. 1 illustrates an example of a system for synchronizing a video feed with internet content displayed on a second device.

FIG. 1 illustrates an example of a system for synchronizing a video feed with internet content displayed on a second device. For example, the system illustrated by FIG. 1 can allow a television viewer who has an internet enabled device (e.g., device 108) to view internet content associated with the television content the viewer is currently viewing on television 104.

In some implementations, home network 100 can include a set-top box 102 that receives video streams from a head-end unit 120. For example, head-end unit 120 can be configured to transmit a video stream with metadata having URL information (e.g., stream 200 of FIG. 2). For example, the video stream metadata can be encoded as side-band data (e.g., closed captioning, subtitle data, etc.). In some implementations, the encoded metadata with URL information can allow a user to access internet content associated with the video stream using the encoded URL information. For example, an advertiser can insert a video commercial into the video stream and encode URL information into the side-band data of the video stream. The encoded URL information can include a website address for internet content associated with the video commercial. The encoded URL information can be synchronized with the video commercial so that the URL is made available at the same time that the video commercial is displayed on a user's television, as described below.

Set-top box 102 can transmit a video feed from the video streams to television 104 for displaying the video feed. In some implementations set-top box 102 can receive a video stream from head-end unit 120 that includes video stream metadata. In some implementations, the video stream metadata can include URL's and timestamps associated with the URLs. For example, the URLs and timestamps can correspond to portions of the video feed (e.g., a video commercial) received in the video stream such that the URLs and timestamps are synchronized with the portions of the video feed. The URLs can correspond to internet content that is related to the portions of the video feed to which the URL is synchronized.

In some implementations, set-top box 102 can extract the URLs and associated timestamps from the video stream metadata and transmit the extracted URLs and timestamps to a web server. In some implementations, the web server is hosted on the set-top box 102. In some implementations, the web server is hosted on router 106. For example, if the web server is hosted on router 106, set-top box 102 can transmit the extracted URLs to the web server on router 106 for storage. In some implementations, router 106 can store the extracted URLs, along with their respective timestamps, in a URL database. For example, the URL database can contain a history of URLs and timestamps received by router 106.

In some implementations, router 106 can receive a request from computing device 108 for a URL corresponding to video stream content viewed on television 104. For example, computing device 108 can be any computing device capable of running a web browser (e.g., laptop computer, tablet computer, smartphone, etc.). In some implementations, the web server running on router 106 can look up the latest or most recent URL in the URL database in response to receiving the request for a URL. For example, the web server can compare the timestamps associated with the URLs in the database to the current time or the time of the request to determine which URL has the most recent timestamp. In some implementations, once the URL with the most recent timestamp is determined, router 106 can transmit the URL to computing device 108.

In some implementations, when computing device 108 receives the URL transmitted by router 106, a web browser running on computing device 108 can retrieve and display the internet content corresponding to the URL. For example, a user of computing device 108 can be watching video stream content on television 104. If the user is interested in learning more about the content displayed on television 104, the user can open a web browser on computing device 108 and direct the web browser to the web server on router 106. The web server on router 106 can send the web browser on computing device 108 the latest URL entered into the URL database and the web browser can be redirected to the website identified by the URL. Thus, a user of computing device 108 can use a web browser on computing device 108 to retrieve internet content that is related to video stream content displayed on television 104.

FIG. 2 illustrates an example video feed 200 with synchronized URLs. For example a video feed can include a video stream that includes content 210-218. For example, content 210-218 can be video content, such as television programming and advertisements. For example, content 212 and content 216 can represent advertising content included in a video stream. In some implementations, video feed 200 can include metadata 200-228. For example, metadata 200-228 can include sideband data, such as closed captioning data and subtitle data. The metadata can be encoded in a stream embedded in video feed 200, for example.

In some implementations, metadata 200-228 can be synchronized with content 210-218. For example, metadata 222 can include a URL associated with advertising content 212. The URL can be an internet address for the provider of advertising content 212. For example, advertising content 212 can represent an advertisement for a product provided by a business. The advertising URL encoded in metadata 222 can be a URL to a website that provides information about the product. Metadata 222 can be synchronized with advertising content 212 such that metadata 222 is received and extracted from video feed 200 by set-top box 102 at about the same time that advertising content 212 is displayed on television 104. In some implementations, synchronization of advertising content 212 and metadata 222 (advertising URL) in the video feed is achieved by encoding the metadata 222 at the same position in video feed 200 as advertising content 212. In some implementations, synchronization of advertising content 212 and metadata 222 (advertising URL) in the video feed is achieved by encoding timing information (e.g., timestamp) for metadata 222 and advertising content 212 in video feed 200. For example, advertising content 212 and metadata 222 can be associated with the same timestamp so that set-top box 102 can synchronize metadata 222 to advertising content 212 based on the timestamps.

3.0 Synchronizing a Video Feed with Internet Content on a Second Device

Figure 3:
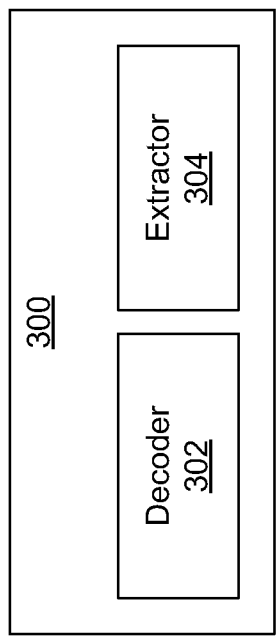
FIG. 3 illustrates an example device for extracting URLs from the video feed.

FIG. 3 illustrates an example device 300 for extracting URLs from the video feed. For example, device 300 can be a set-top box that is configured to receive video stream data and transmit video feeds to a television or other display device. In some implementations, device 300 can be configured to receive video stream data from a content provider (e.g., broadcast television provider, cable television provider, satellite television provider, etc.) head-end unit. In some implementations, device 300 can have wired or wireless networking hardware that allows device 300 to communicate with other devices (e.g., device 400 of FIG. 4) on a network.

In some implementations, device 300 can be configured with decoder 302 for decoding the video stream and transmitting video feeds to a television or other display device. Decoder 302 can also decode video stream metadata from the video stream and send the metadata to extractor 304. For example, video stream metadata can be encoded in sideband data (e.g., closed-captioning data, subtitle data, etc.) and decoded by decoder 302.

In some implementations, device 300 can be configured with extractor 304. In some implementations, extractor 304 can extract URL information from the video feed metadata received from decoder 302. For example, extractor 304 can extract URLs and timestamps associated with the URLs from the video feed metadata. Once extractor 304 extracts the URL and timestamp information from the video feed metadata, extractor 304 can transmit the URLs and corresponding timestamps to notification system 402 of FIG. 4. In some implementations, notification system 402 of FIG. 4 can be hosted by device 300 of FIG. 3.

Figure 4:
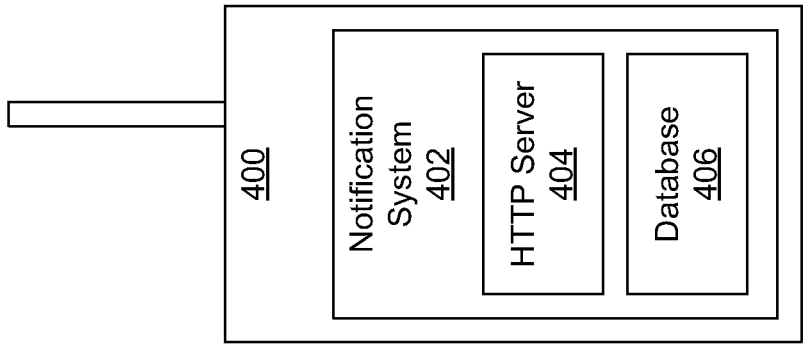
FIG. 4 illustrates an example device for storing and providing the URLs to display devices.

FIG. 4 illustrates an example device 400 for storing and providing the URLs to display devices. For example, device 400 can be any networked device (e.g., a router, set-top box (e.g., device 300), or a wireless controller). In some implementations, device 400 is a home router. In some implementations, device 400 can include a notification system 402 for storing and providing access to URLs associated with and synchronized to video streams.

In some implementations, notification system 402 can include a web server 404 and a database 406 for storing and providing access to URLs associated with content of a video stream. For example, when extractor 304 of FIG. 3 extracts URLs from metadata associated with a video stream received at device 300, extractor 304 can transmit the URLs to web server 404 using an HTTP POST request having a URL and timestamp included in the body of the message.

In some implementations, web server 404 can receive a request identifying a URL and timestamp and can store the URL and timestamp to database 406. For example, database 406 can be a URL database that maintains associations between URLs and their corresponding timestamps. In some implementations, database 406 stores one URL at a time (e.g., a newly added URL will overwrite the previous URL). In some implementations, database 406 stores many URLs and associated timestamps. For example, database 406 can maintain a history of URLs and associated timestamps. In some implementations, database 406 can store a specified or configured number of URLs and timestamps (e.g. store the last 20 URLs). In some implementations, database 406 can store URLs that have corresponding timestamps that fall within a specified time period (e.g., store URLs having timestamps that fall within the last 20 minutes).

In some implementations, web server 404 can receive a request from a computing device (e.g., computing device 108 of FIG. 1) for the latest URL in database 406. For example, web server 404 can receive a HTTP request (e.g., HTTP GET, http://geturl) that indicates that the web server should return the latest URL in database 406 to the computing device. In some implementations, web server 404 can retrieve the latest URL from database 406 and return the URL to the computing device. For example, web server 404 can compare the current time to the timestamps of the URLs in database 406 to determine which timestamp is closest to the current time and the web server 404 can return the URL corresponding to the closest timestamp in an HTTP response to the HTTP request.

In some implementations, the computing device (e.g., computing device 108 of FIG. 1) can receive the URL and a web browser running on the computing device can use the URL to retrieve content from the internet. For example, a web browser can use the URL to retrieve internet content associated with the video stream from which the URL was extracted, as described with reference to FIGS. 1-3 above. The web browser can be redirected to the website identified by the URL, for example. The content can then be displayed in the web browser on a display of the computing device.

3.1 Extracting URLS from Video Feeds

Figure 5:
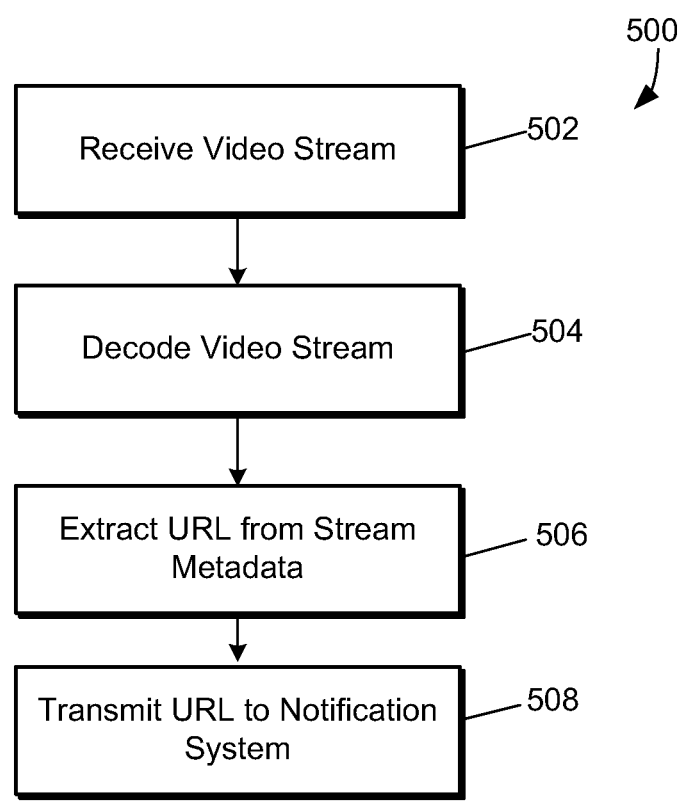
FIG. 5 is a flow diagram of an example process for extracting URLs from a media stream.

FIG. 5 is a flow diagram of an example process 500 for extracting URLs from a video stream. At step 502, a video stream is received. For example, a set-top box can receive a video stream from a head-end unit, as described above with reference to FIGS. 1-4. The head-end unit can generate a video stream containing a video feed and metadata associated with the video feed. The metadata can include URL information and timestamps that are synchronized with portions of the video feed. The metadata can be encoded in a subtitle stream by the head-end unit and transmitted with the video stream to the set-top box.

At step 504, the received media stream can be decoded. For example, the received media stream can be decoded into a video feed and metadata by the set-top box. The set-top box can transmit the media stream to a television or other display device. The set-top box can send the metadata to a URL extractor to extract URL information from the metadata.

At step 506, URLs can be extracted from the video stream metadata. For example, the URL extractor can extract URLs and timestamps from the video stream metadata.

At step 508, the extracted URLs can be transmitted to a notification system. For example, the set-top box can send the extracted URLs with corresponding timestamps to a notification system located on the set-top box. Alternatively, the set-top box can transmit extracted URLs and corresponding timestamps to a notification system located on a network device (e.g., a router, wireless controller, gateway, cloud server, etc.).

3.2 Providing Urls to Display Devices

Figure 6:
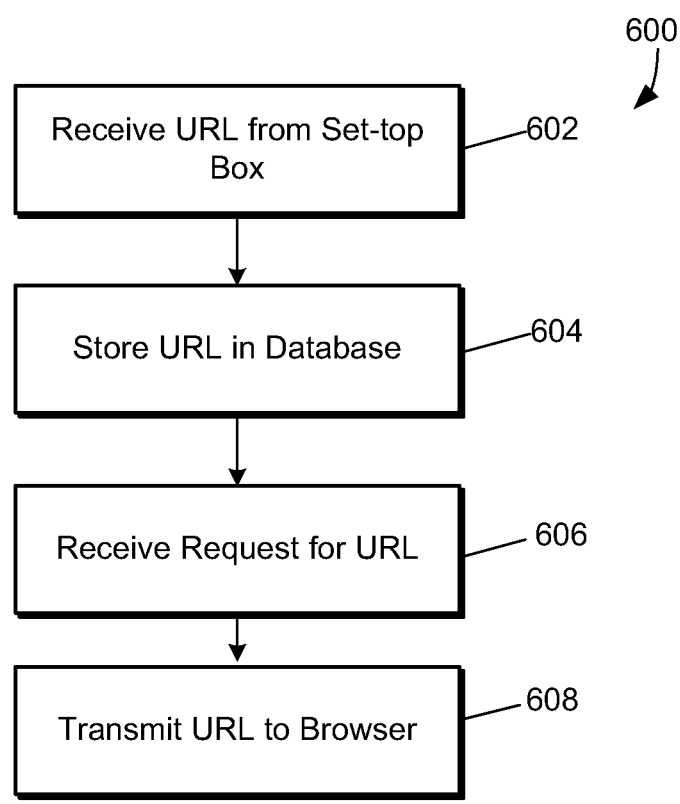
FIG. 6 is a flow diagram of an example process for providing the URLs to display devices.

FIG. 6 is a flow diagram of an example process 600 for providing the URLs to display devices. For example, process 600 can be implemented on a set-top box, a router, a wireless controller, a cloud server, or any other networked device. At step 602, a URL is received from a set-top box. For example, a web server can receive URL information, including URLs and associated timestamps from a set-top box. The URL information can be received in an HTTP POST request that has URL and timestamp parameters, for example.

At step 604, the web server can store the received URL information in a URL database. For example, the URL database can be configured to store one URL at a time. The URL database can be configured to store multiple URLs. The URL database can be configured to store URLs in association with timestamps corresponding to each URL.

At step 606, a request for a URL is received. For example, the web server can receive an HTTP request (e.g., an HTTP GET request) from a web-enabled computing device. For example, a user of the web-enabled computing device can open a browser on the computing device and use the browser to request the URL with the most recent timestamp from the web server. The web server can query the URL database to determine which URL has the most recent timestamp.

At step 608, the web server can transmit a URL to the browser on the user's computing device. For example, once the most recent URL has been determined, the web server can transmit the most recent URL to the browser on the user's web-enabled computing device. The browser can then display content from the website identified by the URL. For example, the browser can be redirected from the web server to the website identified by the URL to display internet content related to the content of the video stream from which the URL was extracted.

3.3 Alternate Implementations

Although implementations are describe above in terms of a home network environment (e.g., home router, home set-top box, home television, home computing device, etc.), other configurations can be implemented.

In some implementations, the URL notification system can be hosted on an external (e.g., not home) network environment. For example, a user can subscribe to a video service provider (e.g., cable, satellite, internet, etc.). The user can have an online account with the video service provider. As the user watches video provided by the video service provider, the user's video endpoint device (e.g., television, set-top box, computer, etc.) can decode and extract URL information from the video stream provided by the video service provider. The user's video endpoint device can transmit the extracted URL information to the user's account with the video service provider. The user's account can store the extracted URL information.

On another computing device, the user can access the user's account with the video service provider and download the most recent URLs to a browser on the computing device. The browser can then be redirected from the user's account to the downloaded URL so that the user can view internet content related to the video content that the user is viewing.

In some implementations, the URL notification system can be hosted in wireless controller. For example, a shopping mall can provide wireless internet access to shoppers. The shopping mall can also provide video displays (e.g., televisions, monitors, etc.) that display advertisements for merchants in the mall. As advertisements are displayed on the video displays, URL information can be extracted from the video streams transmitted to the video displays. The URL information can be stored in wireless access controllers in the shopping mall. When a shopper uses a mobile computing device (e.g., laptop, smartphone, etc.) to accesses a wireless access point connected to a wireless controller, the wireless controller can provide access to the URLs stored on the wireless controller. For example, when the user opens a browser on the user's mobile computing device to access the internet through the shopping mall's wireless network the most recent URL stored on the wireless controller can be presented to the shopper by default.

The media content to internet content synchronization techniques described herein are not limited to video streams. For example, audio and/or radio streams can be synchronized with internet content. Thus, in some implementations a radio receiver can receive a radio signal containing an audio stream and a data stream. For example, some digital radio signals (e.g., HD Radio) can transmit both an audio and data via a digital signal. The radio receiver can decode the audio feed and the metadata for the audio feed. The metadata can include URLs and corresponding timestamps, as described above. The radio receiver can store the URLs and corresponding timestamps locally (e.g., at the radio receiver) and provide access to the URLs through a network interface of the radio receiver. For example, if the radio receiver is a networked radio receiver in the home, the radio receiver can upload the URLs and timestamps to a web server located on a router, as described above with reference to FIGS. 1-6. If the radio receiver is a radio receiver in the car, the radio receiver can provide access to the URLs through a Bluetooth interface, for example. Thus, a user can access internet content related to portions of audio streams encoded in radio broadcasts.

4.0 Implementation Mechanisms—Hardware Examples

Figure 7:
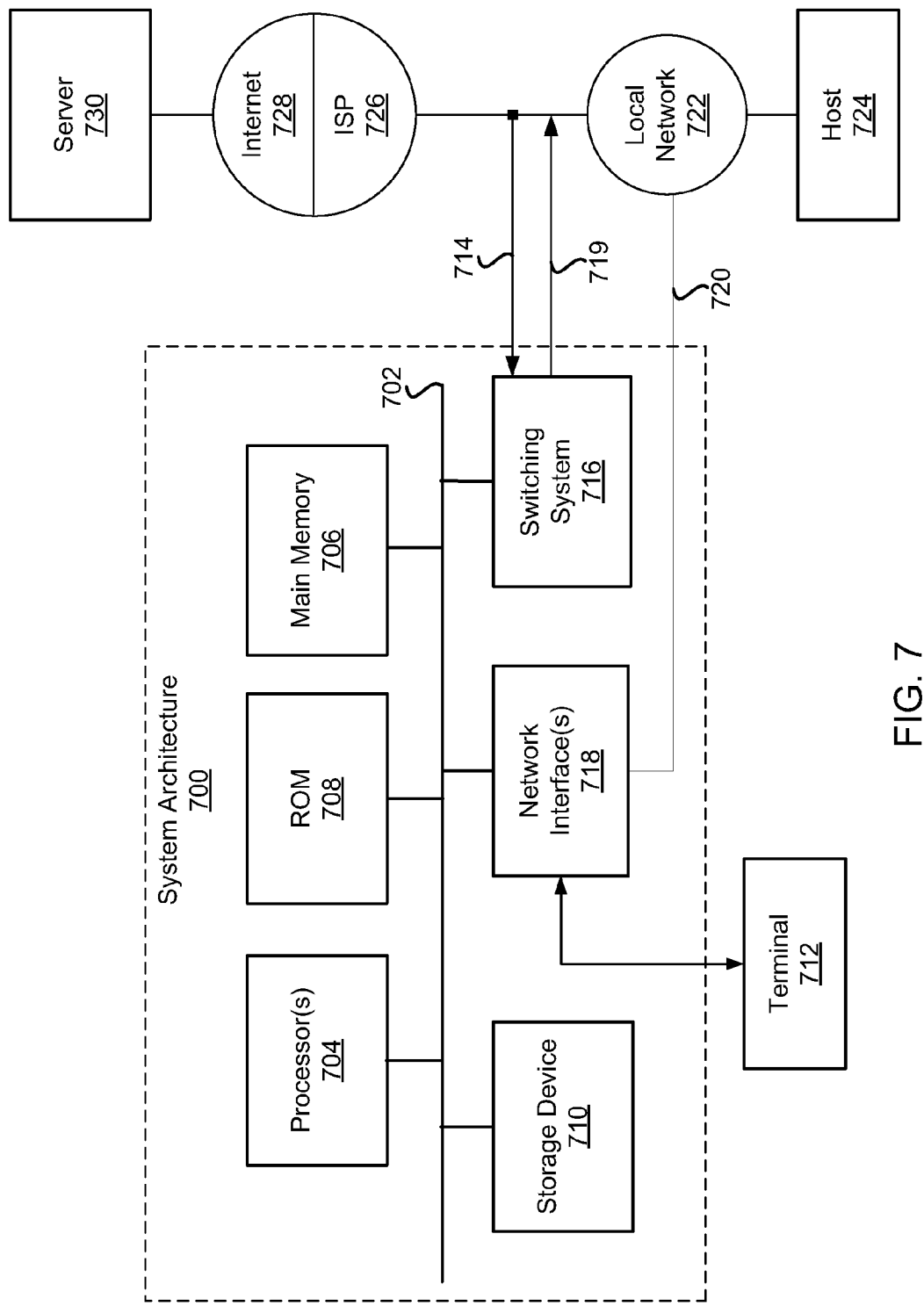
FIG. 7 illustrates an example of a computer system upon which an implementation can be realized.

FIG. 7 is a block diagram that illustrates a computer system 700 upon which an implementation can be realized. Some implementations can be realized using one or more computer programs running on a network element (e.g., a router device, switch, etc.). Thus, in this implementation, the computer system 700 is a router.

Computer system 700 includes a bus 702 or other communication mechanism for communicating information, and a processor 704 coupled with bus 702 for processing information. Computer system 700 also includes a main memory 706 (e.g., a random access memory (RAM), flash memory, or other dynamic storage device) coupled to bus 702 for storing information and instructions to be executed by processor 704. Main memory 706 also can be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710 (e.g., a magnetic disk, flash memory or optical disk) is provided and coupled to bus 702 for storing information and instructions.

A network interface 718 can be coupled to bus 702 for communicating information and command selections to processor 704. Interface 718 can be a serial interface (e.g., an RS-232 or RS-422 interface). An external terminal 712 or other computer system connects to the computer system 700 and provides commands to it using the interface 718. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements can include a local network 722 coupled to one or more hosts 724, or a global network (e.g., Internet 728) having one or more servers 730. The switching system 716 switches information traffic arriving on input interface 714 to output interface 719 according to pre-determined protocols and conventions. For example, switching system 716, in cooperation with processor 704, can determine a destination of a packet of data arriving on input interface 714 and send it to the correct destination using output interface 719. The destinations can include host 724, server 730, other end stations, or other routing and switching devices in local network 722 or Internet 728.

The described techniques related to the use of computer system 700 for synchronizing a video feed with internet content displayed on a second device. According to one implementation, synchronizing a video feed with internet content displayed on a second device is provided by computer system 700 in response to processor 704 executing one or more sequences of one or more instructions contained in main memory 706. Such instructions can be read into main memory 706 from another computer-readable medium (e.g., storage device 710). Execution of the sequences of instructions contained in main memory 706 causes processor 704 to perform the process steps described herein. One or more processors in a multi-processing arrangement can also be employed to execute the sequences of instructions contained in main memory 706. In alternative implementations, hard-wired circuitry can be used in place of or in combination with software instructions. Thus, implementations are not limited to any specific combination of hardware circuitry and software.

The term "computer-readable medium" as used herein refers to any medium that participates in providing instructions to processor 704 for execution. Such a medium can take many forms, including but not limited to, non-volatile storage media, volatile storage media, and transmission media. Non-volatile storage media includes, for example, optical or magnetic disks (e.g., storage device 710). Volatile storage media includes dynamic memory (e.g., main memory 706). Transmission media includes coaxial cables, copper wire and fiber optics, including the wires that comprise bus 702. Transmission media can also take the form of acoustic or light waves (e.g., those generated during radio wave and infrared data communications).

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media can be involved in carrying one or more sequences of one or more instructions to processor 704 for execution. For example, the instructions can initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 can optionally be stored on storage device 710 either before or after execution by processor 704.

Network interface 718 also provides a two-way data communication coupling to a network link 720 that is connected to a local network 722. For example, network interface 718 can be an integrated services digital network (ISDN) card or a modem to provide a data communication connection to a corresponding type of telephone line. As another example, network interface 718 can be a local area network (LAN) card to provide a data communication connection to a compatible LAN. Wireless links can also be implemented. In any such implementation, network interface 718 sends and receives electrical, electromagnetic or optical signals that carry digital data streams representing various types of information.

Network link 720 typically provides data communication through one or more networks to other data devices. For example, network link 720 can provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through network interface 718, which carry the digital data to and from computer system 700, are exemplary forms of carrier waves transporting the information.

Computer system 700 can send messages and receive data, including program code, through the network(s), network link 720 and network interface 718. In the Internet example, a server 730 might transmit a requested code for an application program through Internet 728, ISP 726, local network 722 and network interface 718. For example, one such downloaded application provides for synchronizing a video feed with internet content displayed on a second device as described herein. The received code can be executed by processor 704 as it is received, and/or stored in storage device 710, or other non-volatile storage for later execution.

5.0 Extensions and Alternatives

In the foregoing specification, implementations have been described with reference to numerous specific details that can vary from implementation to implementation. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving, at a first device on a home network, a video stream via an external network, the video stream including metadata associated with content within the video stream and the metadata including a uniform resource locators (URLs) and a timestamp that are synchronized with a portion of the video stream;
decoding, at the first device, the video stream and the metadata;
extracting, by the first device, the URL and the timestamp from the decoded metadata;
transmitting, by the first device, the URL and the timestamp to a web server on the home network for storage via an HTTP POST process, the URL and the timestamp replacing any previously stored URL and the timestamp on the web server so that upon request by a second device in the home network, a URL with a most recent timestamp is transmitted to the second device via an HTTP GET request process, wherein the HTTP GET request indicates that the web server should return the URL with the most recent timestamp, the second device a computing device configured to display content associated with the URL; and
transmitting a video feed based on the decoded video stream to a display device for displaying the video stream while the URL is being stored on the web server
wherein at least one portion of the decoded video stream has a corresponding URL in the decoded metadata and wherein the at least one portion of the decoded video stream and the corresponding URL are synchronized by position in the decoded video stream or by time.

2. The method of claim 1, wherein the URL correspond to internet content associated with the one or more portions of the video stream.

3. The method of claim 1, wherein the decoded metadata is a subtitle stream that includes the URL and wherein the subtitle stream is synchronized with the decoded video stream.

4. The method of claim 1, wherein the decoded metadata is a closed-captioning stream that includes the URL and wherein the closed-captioning stream is synchronized with the decoded video stream.

5. A method comprising:
receiving, at a web server within a home network, an HTTP POST request that includes a uniform resource locator (URL) and a timestamp associated with the URL from a first device within the home network, the URL extracted from metadata in a video stream received at the first device over an external network;
in response to receiving the HTTP POST request at the web server, storing the URL on the web server in association with the timestamp, wherein the URL replaces any previously stored URL on the web server so that upon request by a second device in the home network, a URL with a most recent timestamp is transmitted to the second device, the second device a computing device configured to display content associated with the URL;
receiving, at the web server, a HTTP GET requesting a URL request from the second device in the home network while a video feed of the video stream is being displayed on the first device, wherein the HTTP GET request indicates that the web server should return the URL with the most recent time stamp; and
transmitting from the web server to the second device the URL with the most recent timestamp to the second device,
wherein at least one portion of the video stream has corresponding URL in the metadata and wherein the at least one portion of the video stream and the corresponding URL are synchronized by position in the video steam or by time.

6. The method of claim 5, wherein the first device is a set-top box.

7. The method of claim 5, wherein the URL and timestamp correspond to a portion of a video stream received by the first device.

8. A non-transitory computer-readable medium including one or more sequences of instructions which, when executed by one or more processors, causes:
receiving, at a first device on a home network, a video stream from an external network, the video stream including metadata associated with content within the video stream and the metadata including a uniform resource locator (URL) and timestamp that are synchronized with one or more portions of the video stream;

decoding, at the first device, the video stream and the metadata;

extracting, by the first device, the URL and the timestamp from the decoded metadata;

transmitting, by the first device, the URL and the timestamp to a web server on the home network for storage via an HTTP POST process, the URL and the timestamp replacing any previously stored URL and timestamp on the web server so that upon request by a second device in the home network, a URL with a most recent timestamp is transmitted to the second device via an HTTP GET request process, wherein the HTTP GET request indicates that the web server should return the URL with the most recent time stamp, the second device a computing device configured to display content associated with the URL; and transmitting a video feed based on the decoded video stream to a display device for displaying the video stream while the URL is being stored on the web server, wherein at least one portion of the decoded video stream has a corresponding URL in the decoded metadata and wherein the at least one portion of the decoded video stream and the corresponding URL are synchronized by position in the decoded video stream or by time.

9. The non-transitory computer-readable medium of claim 8, wherein the URL correspond to internet content associated with the one or more portions of the decoded video stream.

10. The non-transitory computer-readable medium of claim 8, wherein the decoded metadata is a subtitle stream that includes the URL and wherein the subtitle stream is synchronized with the decoded video stream.

11. The non-transitory computer-readable medium of claim 8, wherein the decoded metadata is a closed-captioning stream that includes the URLs and wherein the closed-captioning stream is synchronized with the video stream.

12. A non-transitory computer-readable medium including one or more sequences of instructions which, when executed by one or more processors, causes:

receiving, at a web server within a home network, an HTTP POST request that includes a uniform resource locator (URL) and a timestamp associated with the URL from a first device within the home network, the URL extracted from metadata in a video stream received at the first device;

in response to receiving the HTTP POST request at the web server, storing the URL in association with the timestamp in a database of URL on the web server, wherein the URL replaces any previously stored URL on the web server so that upon request by a second device in the home network, a URL with a most recent timestamp is transmitted to the second device, the second device a computing device configured to display content associated with the URL;

receiving at the web server a HTTP GET request requesting a URL request from the second device in the home network while a video feed of the video stream is being display on the first device, wherein the HTTP GET request indicates that the web server should return the URL with the most recent time stamp;

transmitting from the web server to the second device the URL with the most recent timestamp to the second device, wherein at least one portion of the video stream has a corresponding URL in the metadata and wherein the at least one portion of the video stream and the corresponding URL are synchronized by position in the video stream or by time.

13. The non-transitory computer-readable medium of claim 12, wherein the first device is a set-top box.

14. The non-transitory computer-readable medium of claim 12, wherein the URL and timestamp correspond to a portion of a video stream received by the first device.

15. A system comprising:
one or more processors; and
a computer-readable medium including one or more sequences of instructions which, when executed by the one or more processors, causes:

receiving, at a first device on a home network, a video stream from an external network, the video stream including metadata associated with content within the video stream and the metadata including a uniform resource locator (URL) and timestamp that are synchronized with one or more portions of the video stream;

decoding, at the first device, the video stream and the metadata;

extracting, by the first device, the URL and the timestamp from the decoded metadata;

transmitting, by the first device, the URL and the timestamp to a web server on the home network for storage via an HTTP POST process, the URL and timestamp replacing any previously stored URL and timestamp on the web server so that upon request by a second device in the home network, a URL with a most recent timestamp is transmitted to the second device via an HTTP GET request process, the second device a computing device configured to display content associated with the URL, wherein the HTTP GET request indicates that the web server should return the URL with the most recent time stamp; and transmitting a video feed based on the decoded video stream to a display device for displaying the video stream while the URL is being stored on the web server, wherein at least one portion of the decoded video stream has a corresponding URL in the decode metadata and wherein the at least one portion of the decode video stream and the corresponding URL are synchronized by the position in the decoded video stream or by time.

16. The apparatus of claim 15, wherein the URL correspond to internet content associated with the one or more portions of the video stream.

17. The apparatus of claim 15, wherein the decoded metadata is a subtitle stream that includes the URL and wherein the subtitle stream is synchronized with the decoded video stream.

18. The apparatus of claim 15, wherein the decoded metadata is a closed-captioning stream that includes the URL and wherein the closed-captioning stream is synchronized with the video stream.

19. An apparatus comprising:
one or more processors; and
a computer-readable medium including one or more sequences of instructions which, when executed by the one or more processors, causes:

receiving, at a web server within a home network, an HTTP POST request that includes a uniform resource locator (URL) and a timestamp associated with the URL from a first device within the home network, the URL extracted from metadata in a video stream received at the first device;

in response to receiving the HTTP POST request at the web server, storing the URL on the web server in association with the timestamp, wherein the URL replaces any previously stored URL on the web server so that upon request by a second device in the home network, a URL with a most recent timestamp is transmitted to the second device, the second device a computing device configured to display content associated with the URL;

receiving, at the web server, a HTTP GET request requesting a URL request from the second device in the home network while a video feed of the video stream is being displayed on the first device, wherein the HTTP GET request indicates that the web server should return the URL with the most recent time stamp;

transmitting from the web server to the second device the URL with the most recent timestamp to the second device, wherein at least one portion of the video stream has a corresponding URL in the metadata and wherein the at least one portion of the video stream and the corresponding URL are synchronized by position in the video stream or by time.

20. The apparatus of claim 19, wherein the first device is a set-top box.

21. The apparatus of claim 19, wherein the URL and timestamp correspond to a portion of a video stream received by the first device.

* * * * *

UNITED STATES PATENT AND TRADEMARK OFFICE
CERTIFICATE OF CORRECTION

PATENT NO. : 9,654,816 B2
APPLICATION NO. : 13/289227
DATED : May 16, 2017
INVENTOR(S) : Jérôme Chevillat et al.

Page 1 of 1

It is certified that error appears in the above-identified patent and that said Letters Patent is hereby corrected as shown below:

In the Claims

In Column 9, Line 53, please amend as shown:
resource locator (URL) and a timestamp that are In Column 10, Line 14, please amend as shown:
the decoded video stream.

In Column 10, Line 39, please amend as shown:
receiving, at the web server, a HTTP GET request requesting a In Column 10, Line 49, please amend as shown:
a corresponding URL in the metadata and wherein the at In Column 10, Line 52, please amend as shown:
video stream or by time.

In Column 11, Line 50, please amend as shown:
timestamp in a database of URLs in association with the In Column 11, Line 60, please amend as shown:
displayed on the first device, wherein the HTTP GET In Column 12, Line 9, please amend as shown:
15. An apparatus comprising:

In Column 12, Line 48, please amend as shown:
portions of the decoded video stream.

Signed and Sealed this
Twelfth Day of January, 2021

Andrei Iancu
*Director of the United States Patent and Trademark Office*